United States Patent [19]

Dumery

[11] Patent Number: 4,466,284

[45] Date of Patent: Aug. 21, 1984

[54] FINE RESOLUTION LIQUID LEVEL DETECTOR

[75] Inventor: Stefaan D. Dumery, Shrewsbury, Mass.

[73] Assignee: Sprague Electric Company, North Adams, Mass.

[21] Appl. No.: 363,183

[22] Filed: Mar. 29, 1982

[51] Int. Cl.³ ............................................. G01F 23/12
[52] U.S. Cl. ................................... 73/313; 324/251; 73/DIG. 3
[58] Field of Search .................... 73/313, 308, DIG. 3, 73/DIG. 5; 324/204; 340/620, 624, 625

[56] References Cited

U.S. PATENT DOCUMENTS

| | | | |
|---|---|---|---|
| 3,419,798 | 12/1968 | Walton | 324/251 |
| 4,056,979 | 11/1977 | Bongort et al. | 200/84 C X |
| 4,191,951 | 3/1980 | Juzzell | 73/DIG. 3 |
| 4,361,835 | 11/1982 | Nagy | 340/618 X |

Primary Examiner—Daniel M. Yasich

[57] ABSTRACT

A large number of equally spaced Hall-sensors form a column. They are mounted in a tube with a closed bottom. Each sensor is a packaged integrated circuit with a Hall-cell connected to a Schmitt Trigger circuit. An annular float being fitted slidably about the tube carries a compound magnet that generates a pattern of spaced apart magnetic field regions each capable of switching an immediately adjacent Hall-sensor. The Hall sensors are energized sequentially and one at one time. By counting the number of Hall-sensors scanned, from the beginning end of the column to the first Hall-sensor that is switched, a rough measure of the liquid level is obtained. The magnetic field regions are spaced apart by a distance that is not equal to the Hall-sensor spacing so that the pattern of Hall sensor output voltages provides a unique vernier measure of the liquid level that is appropriately added to the aforesaid rough measure.

7 Claims, 11 Drawing Figures

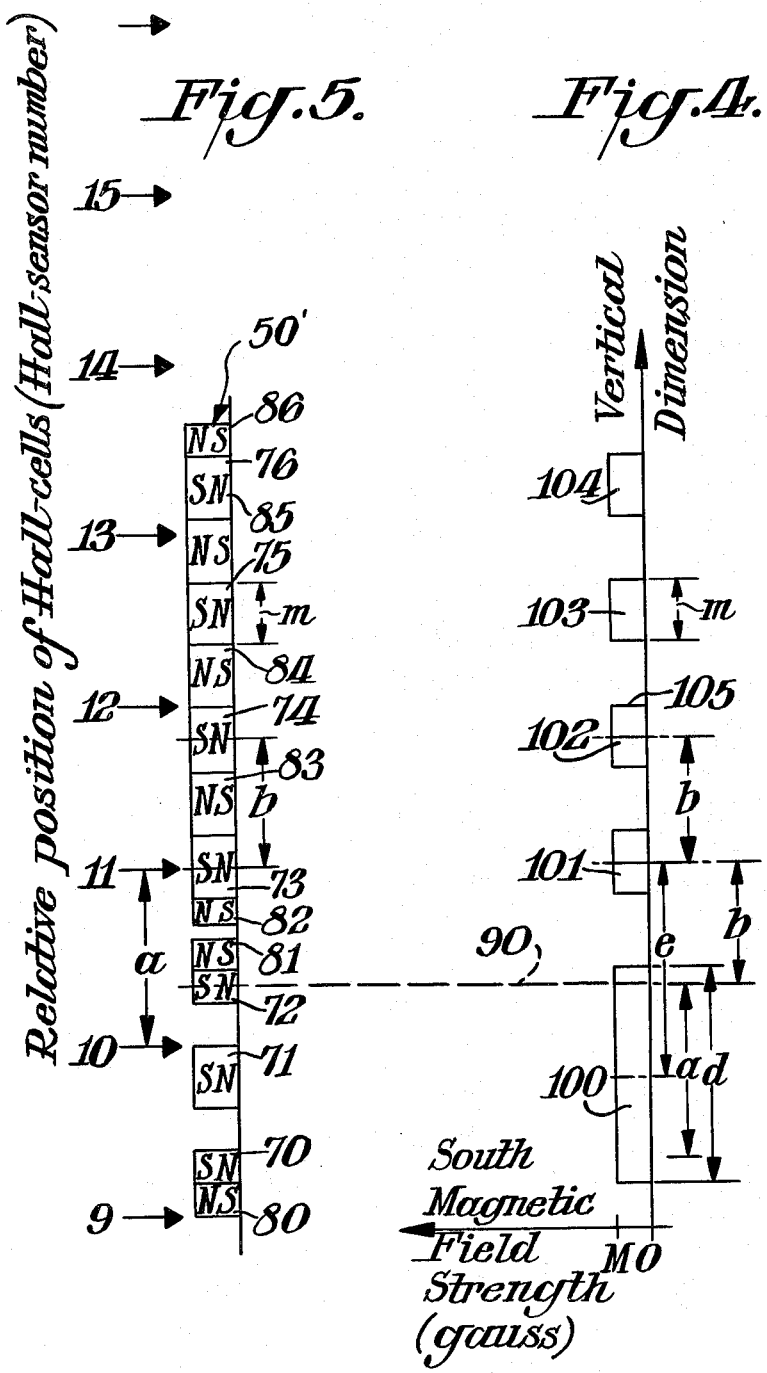

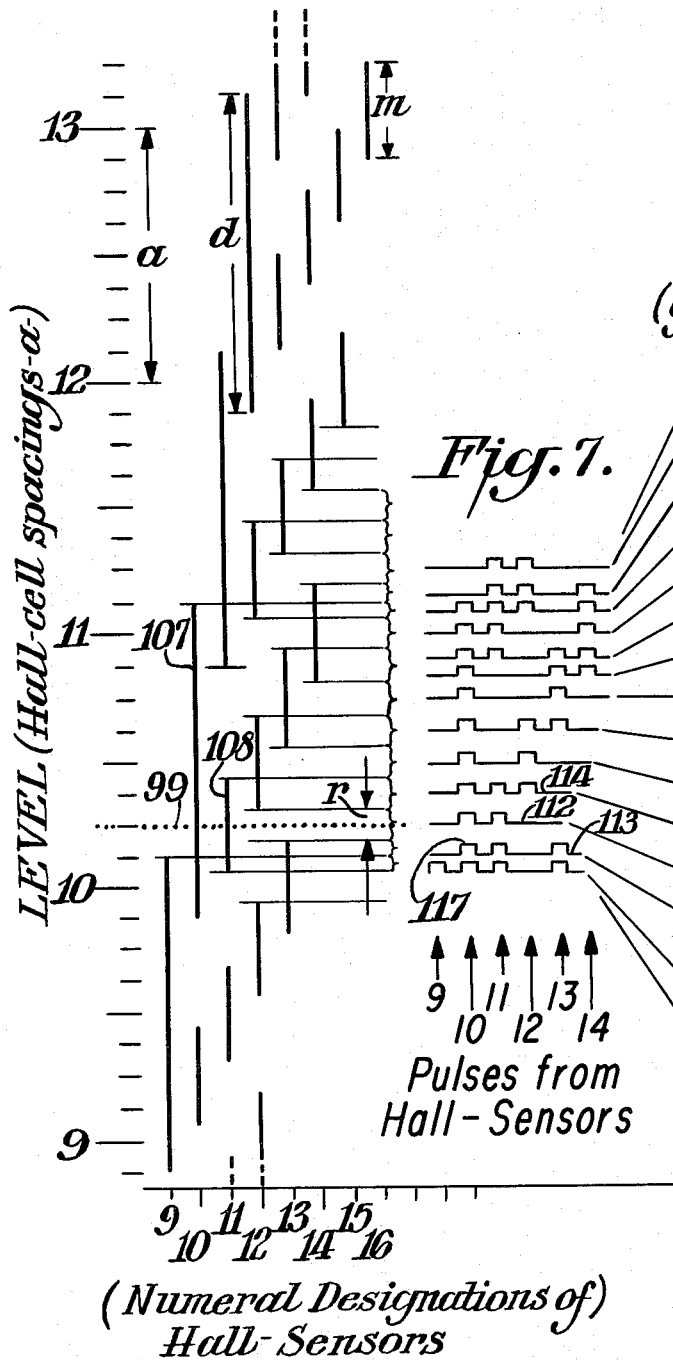

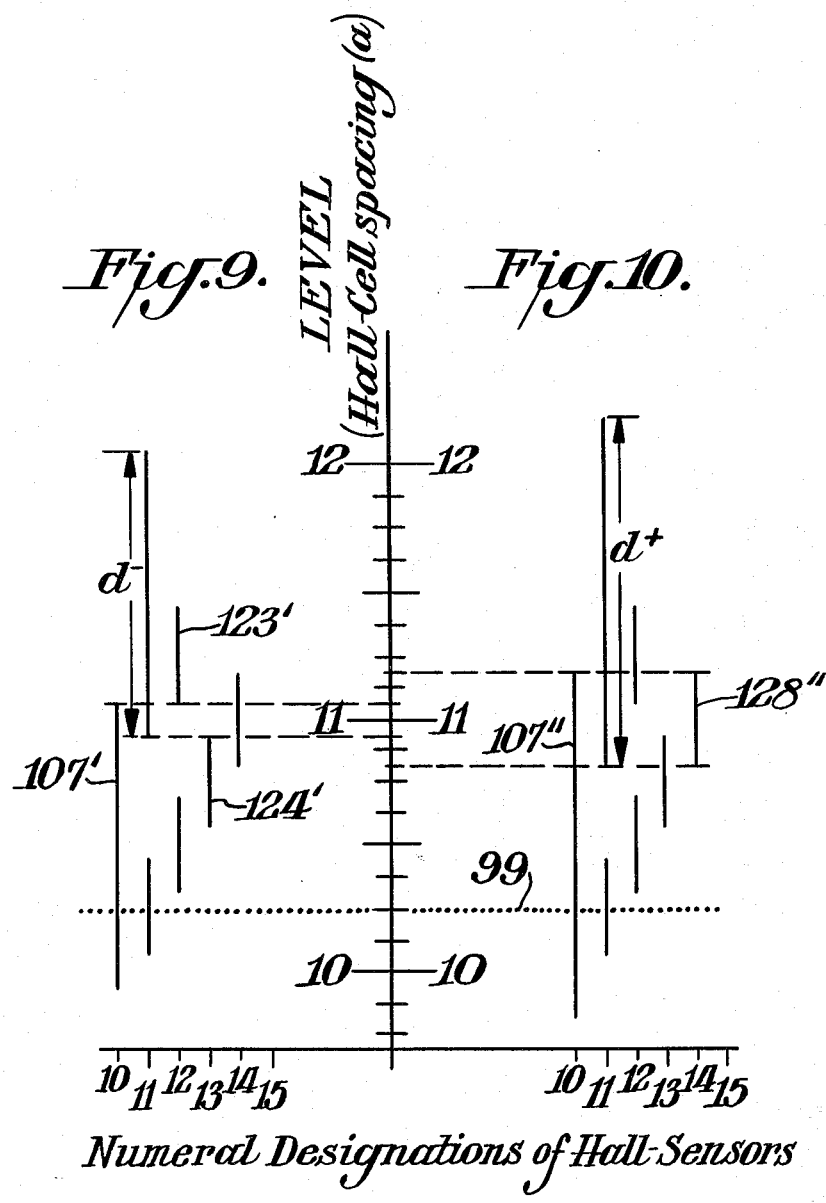

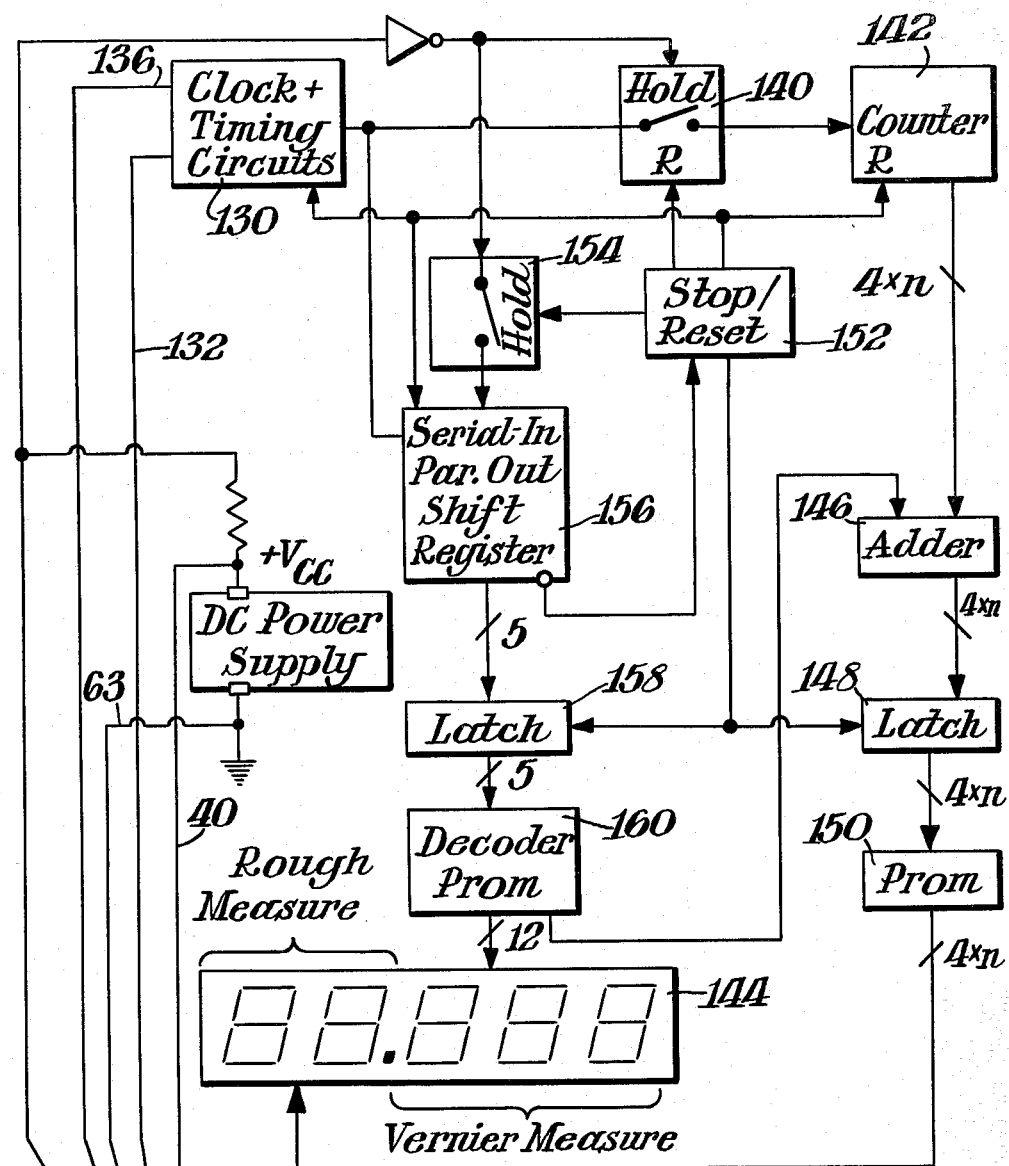
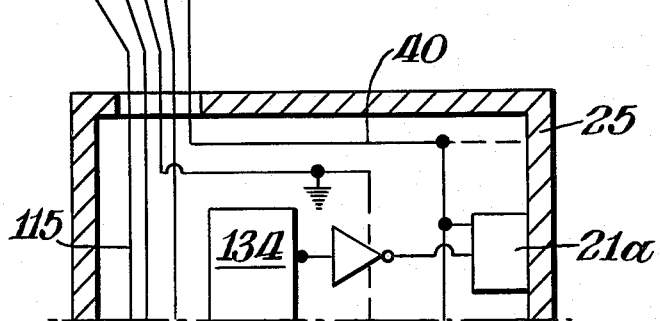
Fig. 11.

FINE RESOLUTION LIQUID LEVEL DETECTOR

BACKGROUND OF THE INVENTION

This invention relates to liquid level detectors of the type having a column of sensors capable of being operated by a signal or field from an adjacent floating signal or field generator, and more particularly pertains to such a level detector having a resolution that is smaller than the spacing of the sensors.

One prior art liquid level gauge is comprised of a string of series connected magnetic field actuated reed-relays. A resistor is connected across each relay. The relay string and resistors are mounted in a protective tube which is mounted vertically in the tank. A magnet is mounted to an annular float that is adapted to be slidably movable about the tube in a vertical direction. The total resistance of the string is taken as a measure of the liquid level. This total resistance is inversely proportional to the number of reed-relays whose contacts are closed and provides an analog measure of the liquid level. Such level detectors are especially insensitive to small level changes when the tank is from about half full to full of liquid.

A level detector of improved accuracy is described by Nagy in his patent U.S. Pat. No. 4,361,835 issued Nov. 30, 1982, and assigned to the same assignee as is the present invention. That detector employs a vertical column of Hall-cells and associated Schmitt trigger circuits that are scanned by turning on one Hall-Schmitt switch at a time in sequence. Their outputs are connected together to an output line. A floating magnet thus causes an adjacent Hall-cell and associated switch to produce a signal on the output line a number of scan time intervals later than the start of a scan cycle. This number of scan time intervals corresponds to the position in the column of that magnet actuated Hall-sensor and can be very easily converted into a binary or other code that is suitable for data storage or display. This measure of liquid level has a characteristic resolution that is equal to the spacing of the Hall-cells in the column, at every liquid level. To obtain a smaller resolution requires the use of a greater number of Hall-cells and associated circuitry that entails a proportional increase in cost.

It is an object of the present invention to provide a multiple Hall-cell type liquid level detector that has a substantially smaller resolution than the spacing of the Hall-cells and thus relatively lower cost for a detector of a given resolution.

SUMMARY OF THE INVENTION

A fine resolution liquid level detector has a column of essentially indentical Hall-sensors. Each Hall-sensor is capable of producing at a sensor output one type of electrical signal (e.g. a low voltage) when the sensor is in a magnetic field of one kind e.g. (south going field). On the otherhand the Hall-sensor is capable of producing at the output another type signal (e.g. a high voltage) when the sensor is in another kind of magnetic field (e.g. a north going field or no field at all).

When means is provided for holding the Hall sensors column in a liquid (e.g. gasoline), there is provided a float that will carry a compound magnet at the surface of the liquid. The magnet is guided and essentially kept at a fixed distance from the column. It will thus travel along the column bringing different groups of Hall-sensors under the influence of its compound magnetic field.

The profile of that field taken along the axis of the Hall-sensor column is comprised of a group of essentially equally long magnetic field regions of the above-noted one kind or polarity (e.g. south going). These are referred to herein as vernier field regions. There are n of these one-kind regions each having a length m, and they have a center-to-center spacing b that is not equal to the spacing a of the Hall-sensors. They have a vernier relationship according to $$b = (n \pm 1)/n \, a$$

When the sign in the numerator is minus, then an optimum design center requires that the field region lengths $$m = 3a/2n$$

The compound magnet is furthermore preferably constructed to additionally provide a main magnetic field region of the above-said one kind that has a length d that is longer than the Hall-sensor spacing a. An optimum design center value for this length is $$d = a(1 + 1/n),$$

and the optimum spacing e from the center of the main field region to the center of the adjacent vernier field region is $$e = (3n - 2)/2n \, a$$

The preferred method of operation comprises sequentially, and one at a time, scanning to energize the Hall-sensors in a direction to approach the main magnet first. The long first magnet, producing a main field region, switches at least one or two Hall-sensors. When the scanning is in a direction to approach the main magnet first, the first Hall-sensor output to become a one-type signal, will always be in response to the influence of the main magnet and not of the next vernier magnet. The number of Hall sensors scanned is counted, from the beginning end of the column to the first sensor switched, to determine the number of Hall-sensor spacings that represents the rough level of the liquid. Vernier information is generated by the signals produced by the Hall-sensors under the influence of the vernier magnets. This information is in binary form and is decoded or translated into vernier distances that are added to the rough level data to measure the liquid level with enhanced resolution. That resolution may be many times smaller than the spacing of the Hall-sensors in the column.

Thus there is provided a liquid level sensor having fewer Hall-sensors for a given resolution or having finer resolution for a given number of Hall-sensors, that for all cases results in a favorably small cost-resolution product.

BRIEF DESCRIPTION OF THE DRAWINGS

FIG. 4 shows in side view the profile of the south magnetic field produced by the floating compound magnet represented in FIG 5.

FIG. 5 shows in side view the compound magnet that produces the magnetic field regions profile of FIG. 4 and also shows relative positions and vertical spacings of the adjacent Hall-sensors.

FIG. 6 shows a bar diagram having an ordinate marked off in units of Hall-sensor spacing and an abscissa along which are marked the numeral designations of said adjacent Hall-sensors referred to above in FIG. 5.

FIG. 7 shows electrical waveforms that appear on the output data line (115) in the detector of FIG. 1 for various liquid levels, which waveforms contain coded vernier distances information.

FIG. 8 is a chart showing the binary codes associated with the waveforms, respectively, of FIG. 7 and the associated liquid level given in units of the spacing between the Hall-sensors.

FIG. 9 shows a portion of a bar diagram similar to that of FIG. 6 except that the bars representing the primary magnetic field region (produced by the main magnet) is shorter than its counterpart in FIG. 6.

FIG. 10 shows a portion of a bar diagram similar to that of FIG. 6 except that the each bar representing the primary magnetic field region (produced by the main magnet) is longer than its counterpart in FIG. 6.

FIG. 11 shows a block diagram of the electronics that may be used to activate and display the liquid levels data from the level detector of FIG. 1.

DESCRIPTION OF THE PREFERRED EMBODIMENTS

Figure 1:
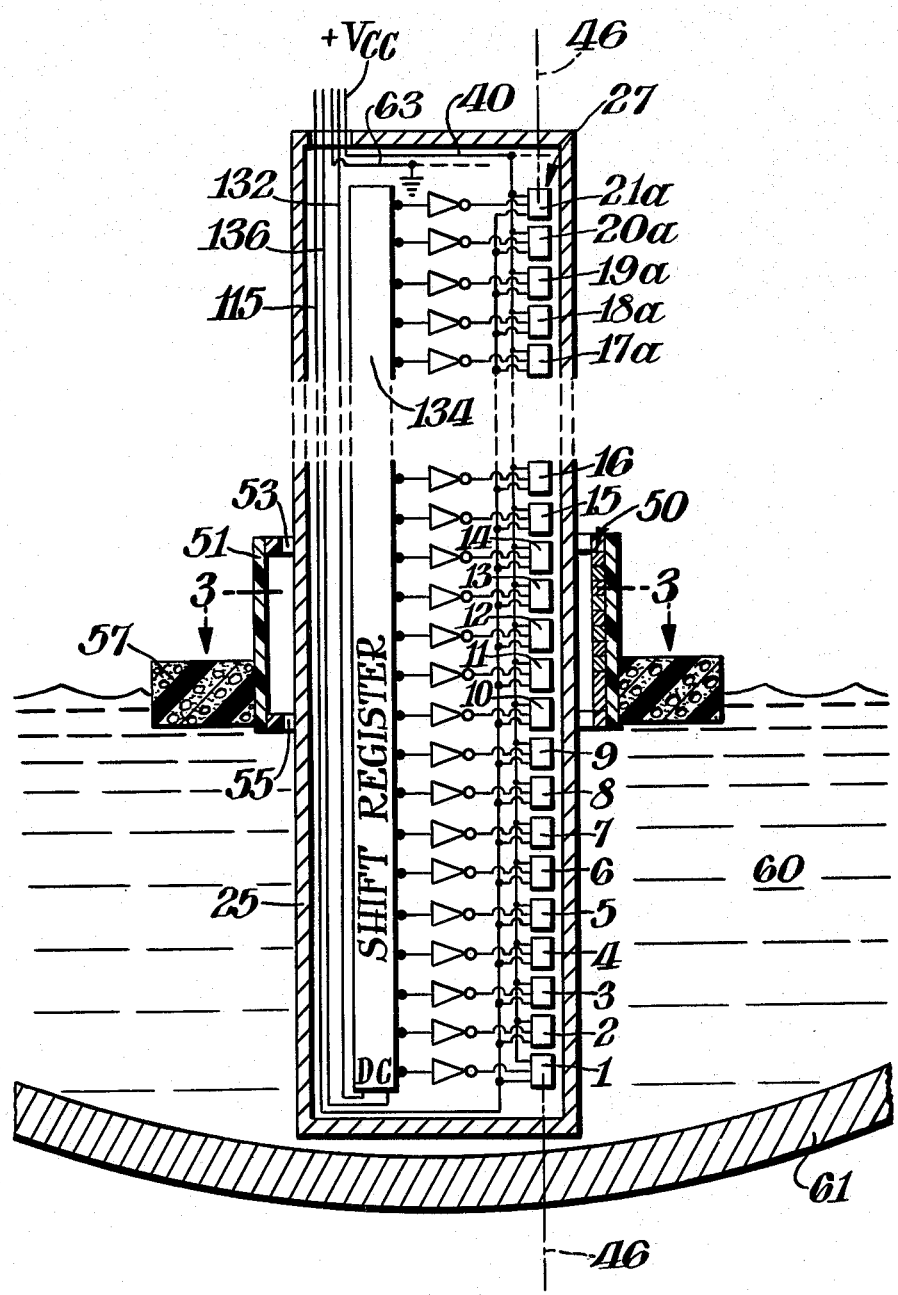
FIG. 1 shows a side sectional view of a liquid level detector of this invention.
Figure 2:
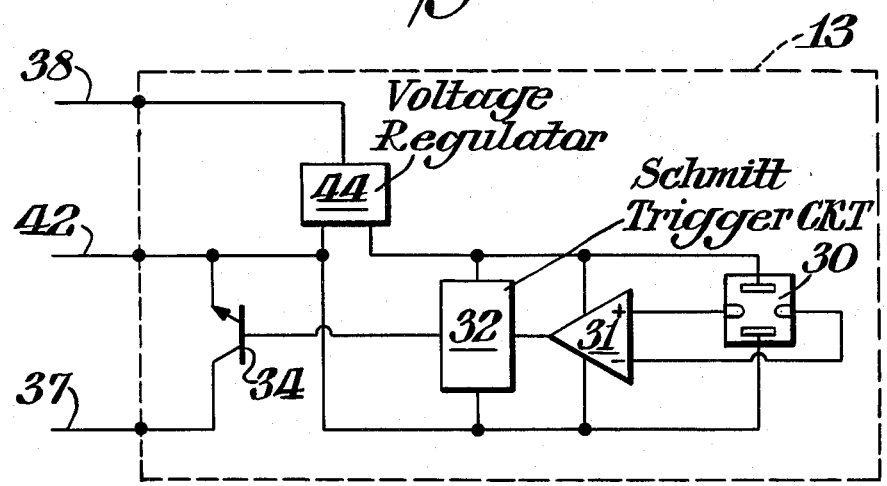
FIG. 2 shows a diagram of a Hall-sensor of which many such are included in the detector of FIG. 1.

The liquid level detector of FIG. 1 has a protective stainless steel tube 25 that has a closed bottom end. Inside the tube 25 is mounted a column 27 of Hall-sensors 1 through 21a. As illustrated in FIG. 2, each of the sensors, e.g. 13, is an integrated circuit including a Hall-cell 30, a Hall-cell amplifier 31 and a Schmitt trigger circuit 32. Such an integrated circuit Hall-sensor 13 as is diagramed in FIG. 2 is described by R. Genesi in U.S. Pat. No. 3,816,766 issued June 11, 1974, that is assigned to the same assignee as is the present invention. Thus when the magnetic field ambient to a Hall-cell 30 exceeds a predetermined strength, transistor 34 turns on. The Hall-sensor output voltage, appearing at the bottom lead wire 37 with respect to the middle lead wire 42, will then drop to zero from a positive value. Power is supplied to the Hall-sensors, e.g. 13, by connecting via buss 40 a d.c. power supply (not shown, of +Vcc volts) between sensor lead wires 38 and 42 which energizes the on-board voltage regulator 44.

The essentially identical Hall-sensors, e.g. 13, are all uniformly spaced from one another by 0.54 inches (13.7 mm) and are oriented so that the Hall cells, e.g. 30, are adjacent to and outwardly facing so as to be most sensitive to magnetic lines of force that are normal to the wall of the tube 25. The Hall-cells, e.g. 30, in column 27 have a common vertical axis 46 and of course are themselves located every 0.54 inches along axis 46.

Figure 3:
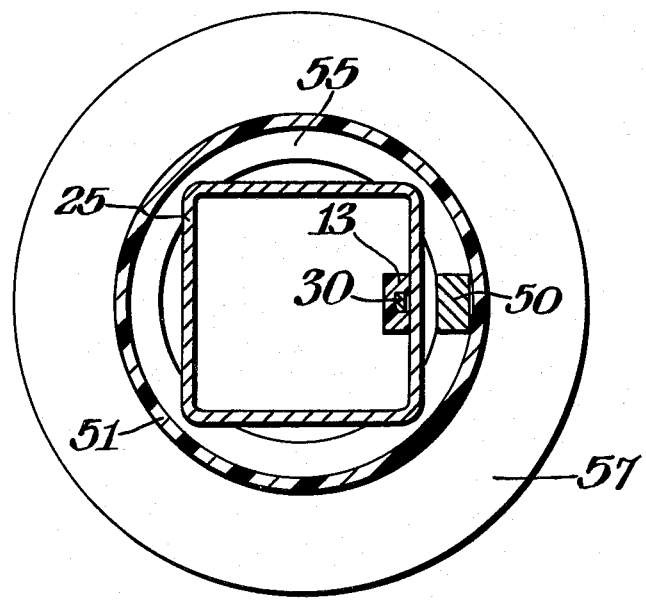
FIG. 3 shows a sectional view taken in plane 3—3 of the liquid level detector of FIG. 1.

A compound magnet assembly 50 is mounted inside a tube 51. The tube 51 is larger than and slides over tube 25. The tube 25 is preferably square as shown in FIG. 3, and the tube 51 is guided to remain coaxial with tube 25 and oriented so that the magnet assembly 50 remains aligned with the Hall-sensors of column 27. This guidance is provided by two essentially identical plastic bushings 53 and 55 mounted in the ends of tube 51, respectively. The sliding tube 51 is mounted inside a toroidal float 57 so that for each level of liquid 60, a different group of Hall-sensors (e.g. 13) are under the influence of magnet assembly 50. At the lower part of FIG. 1 there is shown a portion of the tank 61 containing the liquid 60.

As was the case in the above-mentioned Nagy patent application, electronics are provided to sequentially connect the supply voltage that appears across Vcc buss 40 and ground buss 63 to each of the Hall-sensors 1, 2, 3, etc. in turn. This is accomplished by permanently connecting the supply leads 38 of all sensors (e.g. 13) to Vcc buss 40, and sequentially connecting the ground buss 63 to the ground lead wires 42 of at first the sensor 1, then 2 and so on up the column 27. This cycle is continuously repeated. Only one Hall-sensor (e.g. 13) is electrically excited at any given time. This feature advantageously keeps the power consumption to a minimum. Also, a Hall-sensor 13 has a characteristic operating hysteresis wherein there can be expected some variation in both the magnetic field strength that will just switch it on as well as the field that will thereafter turn it off. In this system having a Hall-sensor scanning means, only the Hall-sensor turn-on field strength is of significance because the power (Vcc) to each Hall-sensor is periodically removed. Thus in the manufacture of the Hall-sensor 13, techniques for control of the turn-on field strength can advantageously ignore the turn-off field strength.

The compound magnet assembly 50 produces at the Hall-sensor column 27 an alternatively pattern of south magnetic field regions as a function of vertical distance as is indicated in FIG. 4. Only the "south" magnetic field is represented there since only a south field region turns on the particular Hall-sensors (13) used in the prototype when they face outwardly, namely integrated circuit type UGN 3019T made by Sprague Electric Company, Worcester, Mass.

With reference to FIG. 5, the discrete magnets 70, 71, 72, 73, 74, 75 and 76 are all oriented to produce a south field at their left side (as shown). These are considered to be the principal magnets of an alternate magnet assembly 50' to the assembly 50 FIG. 1 because they are intended to turn on Hall-sensors 13. The discrete magnets 80, 81, 82, 83, 84, 85 and 86 produce a north field at their left faces serving to shape the principal south magnetic field regions 100 to 104 so that their top and bottom perimeters are as nearly straight and horizontal as possible to maintain a high accuracy of the vernier measure in spite of small variations in the lateral separation between the magnets 101–104 and the Hall-cells 30. The south field regions profile shown in FIG. 4 and the individual magnets 70–76 and 80–86 in FIG. 5 are essentially drawn to the same vertical scale and are registered with respect to each other. The magnets 71, 73, 83, 74, 84, 75, 85 and 76 are all of the same size and have a vertical dimension M that in the prototype is 0.200 inch (5.08 mm). The magnets 80, 70, 72, 81, 82, and 86 are all of the same size and have a vertical dimension of just half that of the dimension m. Both groups of magnets are made of the same samarium-cobalt material and have the same strength per unit vertical length (height as shown).

The bottom-most south magnetic field regions 100 spans a vertical distance greater than a Hall-regions interval, a, and is used to obtain a rough measure of liquid level, much as was the single magnet system described in the above-mentioned patent application. The equally tall, (m) and equally spaced (b) south field regions 101, 102, 103 and 104 are used to obtain a finer or vernier measure of the liquid level as is further explained below.

Actually more than one magnet has been used here to form each discrete south field region. For example the principal field region 100 is formed and shaped by magnets 80, 70, 71, 72 and 81 whereas fewer or even one could have been used. This group will hereinafter be designated the main magnet. Similarly the vernier field regions, e.g. 101, are each formed and shaped by several magnets, e.g. full magnets 82, 73 and half of magnet 83. This group will be called the first vernier magnet. Likewise field regions 103 and 104 are formed by third and fourth vernier magnets, respectively.

To the side view of the magnet assembly 50' in FIG. 5 are also indicated the relative positions of the Hall-cells (30), corresponding to the Hall sensors 9 through 14, substantially as they appear in FIG. 1. Note that the vertical interval, a, between the Hall-sensors and thus the interval between the Hall-cells is significantly greater than the center to center vertical distances, b, between the adjacent vernier magnets that produce the "vernier" south field regions 101, 102, 103, 104. The reference line 90 in FIG. 4 corresponds very nearly in this embodiment to the liquid level as is established in FIG. 1.

In FIG. 4, each south field profile is shown with a uniformly constant magnitude, M. In fact, these field regions exhibit an undulating magnitude, but always exceeding the value M at the Hall-sensor column 27 that insures the switching of a horizontally aligned Hall-sensor (e.g. 13). In the prototype sensor, the separation between the face of the magnet 50 and the Hall-sensor package was about 0.06 inches (1.5 mm) and at this separation the profile of FIG. 4 is an accurate representation of the effective field, including remarkably straight and horizontal peripheral boundaries, e.g. 105.

The diagram of FIG. 6 is to present a clearer view of the means by which the level detector of this invention provides a vernier or interpolated measure of liquid level between the adjacent of the Hall-sensors.

For each liquid level, there is a corresponding horizontal line in FIG. 6. For example, the horizontal dotted line 99 is one quater of an interval "a" higher than the Hall-cell of sensor 10. This is consistent with the particular level of liquid indicated in FIGS. 1 and 4.

Each bar in the diagram of FIG. 6 has a length that is equal to the vertical extent of one of the south magnetic field regions 100–104. For the particular liquid level illustrated, one can surmise from FIG. 1, and definitely determine from FIG. 4 combined with FIG. 5 or from FIG. 7 alone, that the Hall sensors 10 and 11 are turned on by south field regions 100 and 101, respectively. It can further be seen that at this level, no other Hall-sensors are turned on. These facts are apparent from a glance at the diagram of FIG. 6 since the level line 99 is intercepted only by the long bar 110 and short bar 111. The long bar 107 represents the field region 100 while the bar 108 represents the field region 101. The long bar 107 is in the vertical line of Hall-sensor 10 (in the diagram of FIG. 7) while the bar 108 is in the vertical line of Hall-sensor 12.

The waveforms of FIG. 7 represent the various composite time voltage signals appearing on the data output line 115 for various levels. Each upward excursion or pulse, e.g. 117, of a waveform, e.g. 113, (with time increasing as is conventional from left to right) is always one produced by the tall principal magnetic field region 100. At the liquid level corresponding to dotted line 99 in FIG. 6, the waveform 112 appears. It appears repeatedly on the output data line 115. Thus the digital code is 11000 as noted in the associated chart of FIG. 8. Also from FIG. 8, that vernier indication of level is 0.250 times the interval "a", and it is added to the "rough" level corresponding to the level of the tenth Hall sensor 10. The 10.250 is therefore the decimal measure of liquid level in units of "a" (Hall-cell spacing).

Returning to FIG. 6, the resolution, r, of the system corresponds to the smallest increment of liquid level that is distinguished by the system. The level can increase (above line 99) just to the point at which waveform 114 would be obtained and lowered just to the point at which waveform 113 would be obtained. Over this small increment of level, r, the output waveform 112 remains unchanged. In this instance this resolution increment, r, is 0.125 a, as can also be seen from the chart of FIG. 8. Since the Hall-sensor spacing, a , is in this case 0.54 inches then the resolution is 0.067 inches (1.7 mm).

A portion of the bar diagram of FIG. 6 is repeated in FIGS. 9 except that the height of the main magnet (principal field region 100) is assumed to be shorter. It is shortened to exactly the point that with an increasing level, Hall-sensor 10 is switching off simultaneously with the switching on of Hall-sensor 12. This condition is manifest in FIG. 9 where the upper end of bar 107' is coincident with the level of the lower end of bar 123', which level is at 11.0625 (or 11 1/16). This condition, of course, leads to ambiguity in that such an exact coincidence cannot possibly be achieved and or maintained as a practical matter due to tolerances of manufacture and stability of components thereafter. Consequently, at this level, it is quite possible that neither Hall-sensor 10 or 12 would turn on in which case the code 01001 would be generated that would be decoded to indicate erroneously the level 11.750.

With the same short bar 107' in FIG. 9 it can be seen that another such coincidence at level 10.9375 (or 10 15/16) occurs. The code 10001 may be generated that cannot be decoded at all.

Similarly, the bar 107" associated with a longer principal field is shown in FIG. 10 such that at a level (11.1875 or 11 3/16) the top end of bar 107" is coincident with the top end of bar 128". At this level one might except that under certain circumstances neither of Hall-sensors 10 or 14 would be turned on and the code generated would then be 01100 decoded to erroneously indicate a level of 11.250.

A number of variations may be made in the structure of the level detector of the preferred embodiment. For example the center to center spacing e of principal and adjacent vernier field regions, 100 and 101, may be $$3n - 1/2n \ a$$

or $$3/2 \ a$$

althought it is still preferable to use $$e = 3n - 2)/2n \ a$$

since the span of the whole compound magnet is thereby kept to a minimum.

Also, the vernier of this invention may be based upon a center-to-center spacing b between vernier magnetic field regions (101–104) that is greater than the spacing a of the Hall-sensors (e.g. 13) such that $$b=(n+1)/n\ a.$$

However, in a detector of that structure the compound magnet is unfortunately longer and the number of digital bits in the vernier code (e.g. appearing on the data line 115) is now two greater than the number n of vernier magnets used, instead of one greater than the number of vernier magnets. For example when n=4 there would be 6 vernier data bits instead of 5 as shown in FIG. 7. This causes an increased complexity in the electronics. For these reasons the (n−1)/n structure of the above-described preferred embodiment is much preferred.

A typical scanning cycle is briefly described with reference to the electric block diagram of FIG. 11 and the level detector of FIG. 1.

A data bit generated by the timing circuits 130 is inserted via line 132 into the bottom-most bit of shift register 134. Clock pulses sent from clock circuit 130 via line 136 then shift the one bit sequentially up the shift register 134 activating Hall sensors 1–21a one at a time. When the first Hall sensor under the influence of the principal magnetic field is reached, the first occuring data bit appears in the Hall-sensor output line 115 and the hold switch 140 is turned off to stop the count of clock pulse by counter 142. The counter output is then displayed in the first two digits of display 144 after passing through adder 146, latch 148, and PROM 150.

As the scanning continues, a pattern of sensor output pulses is generated in the data line 115. The stop/reset circuit 152 closes the hold switch 154 admitting this vernier data to the serial-in parallel-out shift register 156 which is sent through latch 158 for decoding at PROM 160 and then to display 144.

In a comparison of the level detector described herein and a well known mechanical vernier gauge, it will be noted that the column of equally spaced Hall-sensors corresponds to the regular scale of the gauge and the vernier magnets, and vernier field regions correspond to the vernier scale of the gauge.

What is claimed is:

1. A fine resolution liquid level detector comprising:
   (a) a column of uniformly spaced Hall-sensors each of said Hall-sensors being capable of producing, at an output, one type electrical signal when in a magnetic field of one polarity, and being capable of producing, at said output, another type electrical signal when in another polarity of magnetic field;
   (b) a compound magnet assembly;
   (c) means for holding said column vertically in a liquid;
   (d) means for guiding said compound magnet assembly along and at a substantially fixed distance from said Hall-sensors column;
   (e) means for keeping said compound magnet assembly at the surface of said liquid; and
   (f) said compound magnet assembly being for producing at said column of Hall-sensors a fixed pattern of spaced apart magnetic field regions of said one polarity, a number n of said regions, designated vernier regions, each having a uniform center to center spacing b as measured along the axis of said column, b being unequal to a, wherein a is said uniform spacing of said Hall-sensors, and another one of said field regions, designated a main region, having a length d as measured along said axis that is greater than the spacing a.

2. The liquid level detector of claim 1 wherein said spacing b is about equal to said Hall-sensors spacing a according to $$b=(n-1)/n\ a.$$

3. The liquid level detector of claim 2 wherein said vernier regions have a span m taken along said axis and wherein $$m=3a/2n$$

and $$d=a(1+1/n)$$

4. The liquid level detector of claim 3 wherein the center to center spacing e of said region and an adjacent of said vernier regions is $$e=(3n-2)/2n\ a.$$

5. The liquid level detector of claim 1 wherein said main region is located in said pattern at one end and said vernier regions toward the other end.

6. The liquid level detector of claim 1 wherein said compound magnet assembly includes a group of discrete magnets for generating each of said vernier field regions and comprises a principal vernier magnet that is oriented with the magnetic pole of one polarity facing said column and having a height, measured in a direction of the axis of said column, essentially equal to said span m; and two peripheral vernier magnets each being adjacent to said principal vernier magnet on either side thereof, respectively, each being oriented with the pole of the other polarity facing said column, and each having a height measured in a direction of said axis essentially equal to 1/2 the span m, so that said vernier field regions are abutted in the two axial directions by a field of the other polarity, the interfaces therebetween being essentially perpendicular to said axis to avoid changes in the accuracy and calibration of said level detector due to any changes that may occur in said distance between said magnets and said column.

7. The liquid level detector of claim 1 wherein $$b=(n-1)/n\ a\ \text{and}$$

wherein each of said n regions has a span m measured along said column axis that is $$m=3a/2n.$$

* * * * *

UNITED STATES PATENT AND TRADEMARK OFFICE
CERTIFICATE OF CORRECTION

PATENT NO. : 4,466,284

DATED : August 21, 1984

INVENTOR(S) : Stefaan D. Dumery

It is certified that error appears in the above—identified patent and that said Letters Patent is hereby corrected as shown below:

Cover page, under "[56] References Cited - U.S. PATENT DOCUMENTS", the following U.S. patents should be listed:

-- 3,646,293  2/1972   Howard           200/84
   3,935,741  2/1976   Zinsmeyer et al  73/313
   4,084,436  4/1978   Smitherman       73/313
   4,124,814  11/1978  Lauerman         324/208  --

Column 2, line 13, "b=(n±1)/n a" should read -- b=[(n±1)/n]a --

Column 2, line 33, "e=(3n-2)/2n a" should read
     -- e=[(3n-2)/2n]a --

Column 4, line 10, "Vccc" should read -- Vcc --

Column 4, line 32, "alternatively" should read -- alternating --

Column 4, line 58, "M" should read -- m --

Column 4, line 65, "regions" should read -- region --

Column 4, line 66, "Hall-regions" should read -- Hall-sensors --

Column 6, line 49, "except" should read -- expect --

Column 6, line 59, "3n-1/2n a" should read -- [(3n-1)/2n]a --

Column 6, line 63, "3/2a" should read -- (3/2)a --

Column 6, line 67, "e=3n-2)/2n a" should read
     -- e=[(3n-2)/2n]a --

UNITED STATES PATENT AND TRADEMARK OFFICE
CERTIFICATE OF CORRECTION

PATENT NO. : 4,466,284

DATED : August 21, 1984

INVENTOR(S) : Stefaan D. Dumery

It is certified that error appears in the above—identified patent and that said Letters Patent is hereby corrected as shown below:

Column 7, line 7, "b=(n+1)/n a" should read -- b=[(n+1)/n]a --

Claim 2, line 4, (Column 8, line 16) "b=(n-1)/n a" should
read -- b=[(n-1)/n]a --

Claim 4, line 2, (Column 8, line 28) after "said"
insert -- main --

Claim 4, line 4, (Column 8, line 31) "e=(3n-2)/2n a" should
read -- e=[(3n-2)/2n]a --

Claim 7, line 2, (Column 8, line 57) "b=(n-1)/n a" should
read -- b=[(n-1)/n]a --

Signed and Sealed this

Twelfth Day of February 1985

[SEAL]

Attest:

DONALD J. QUIGG

Attesting Officer        Acting Commissioner of Patents and Trademarks